United States Patent
Yap

(10) Patent No.: US 7,823,000 B2
(45) Date of Patent: Oct. 26, 2010

(54) MEASURING AC POWER CONSUMPTION USING CHOKE WITH INDUCTIVE POWER SENSOR

(75) Inventor: Kin Hin Yap, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 11/829,128

(22) Filed: Jul. 27, 2007

(65) Prior Publication Data

US 2009/0031157 A1 Jan. 29, 2009

(51) Int. Cl.
*G06F 1/26* (2006.01)

(52) U.S. Cl. .................................... 713/340; 713/300
(58) Field of Classification Search .................. None
See application file for complete search history.

(56) References Cited

U.S. PATENT DOCUMENTS

| | | | |
|---|---|---|---|
| 5,804,953 A | 9/1998 | Bowyer et al. | |
| 6,944,034 B1* | 9/2005 | Shteynberg et al. | 363/21.13 |
| 6,961,856 B1 | 11/2005 | Kouropoulus | |
| 2001/0045863 A1* | 11/2001 | Pelly | 327/552 |
| 2002/0024829 A1* | 2/2002 | Kakuda | 363/127 |
| 2008/0018402 A1* | 1/2008 | Vogman | 330/256 |

* cited by examiner

*Primary Examiner*—Dennis M Butler

(57) ABSTRACT

An electrical device includes a choke with a sensor inductor in addition to inductors used for supplying AC power.

22 Claims, 2 Drawing Sheets

MEASURING AC POWER CONSUMPTION USING CHOKE WITH INDUCTIVE POWER SENSOR

BACKGROUND OF THE INVENTION

Power consumption is an increasingly substantial part of the cost of computer ownership. Improvements in circuit efficiency are far outweighed by increases in circuit density— e.g., the move to multi-core processors. In large multi-server installations, power requirements can run up against limits on the ability of utility companies to deliver needed electricity, and limits on the capability of cooling systems to remove heat dissipated as power is consumed.

Workload management is one approach to limiting power consumption. Many computer components are designed with multiple performance levels so that workloads can be handled at a lower performance level to save power. While this approach is valuable even when the amount of power consumed and saved is not known, more intelligent tradeoffs between performance and power consumption would be achievable where power consumption is known.

Power measurements are typically achieved using a current-sense resistor or an e-fuse to measure DC power consumption with each computer. This approach can be expensive, requiring a precision resistor and/or other power electronics. Inherently, there is some loss of power and some heat generated due to the power drop across the resistor or power electronics. Also, the power electronics may represent an additional point of failure that could impact reliability. In addition, a measurement of DC power consumption does not necessarily correspond precisely to AC power consumption, which most closely corresponds to the costs charged by an electric utility. Accordingly, an economical yet more effective approach of measuring AC power consumption by a computer is needed.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Figure 1:
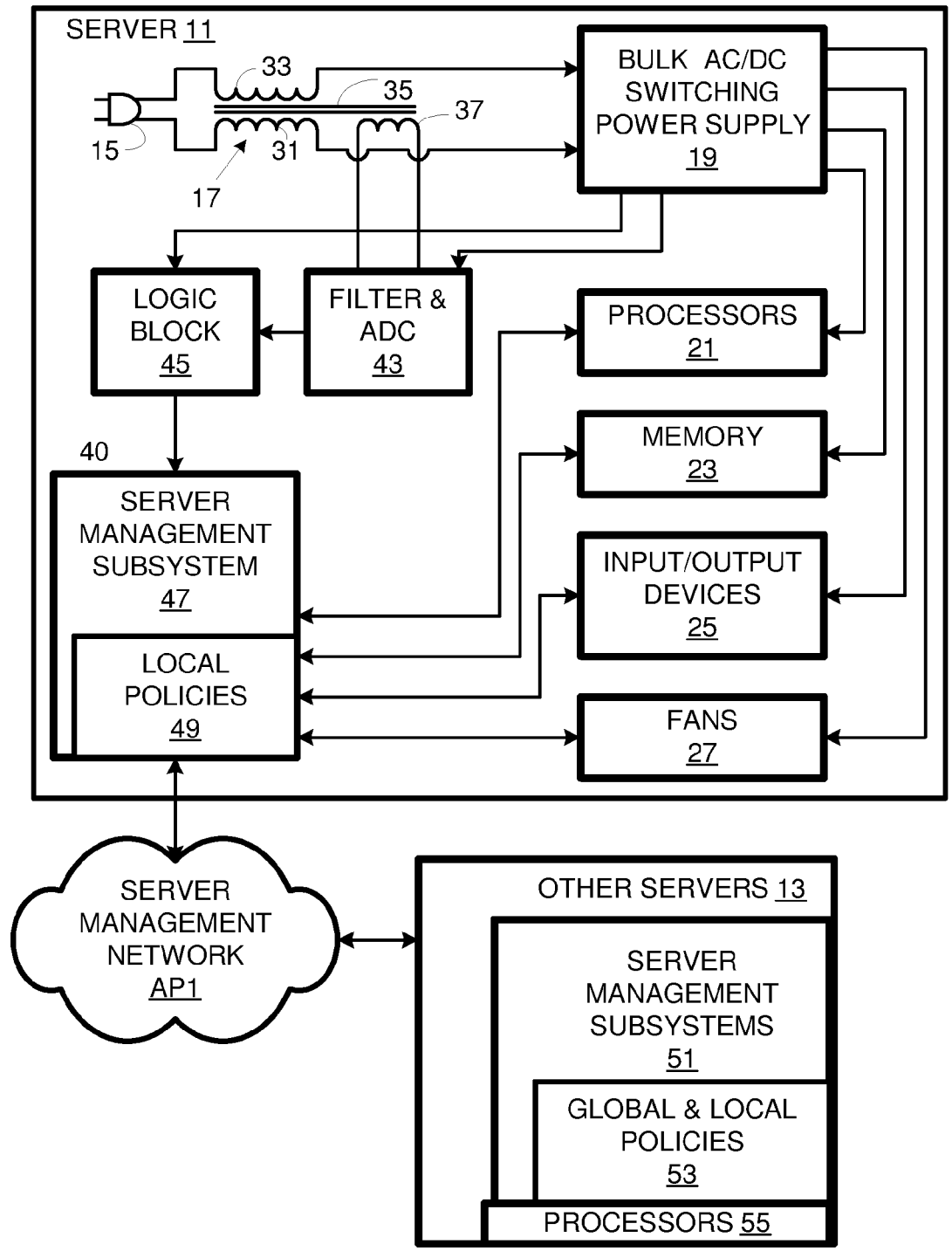
FIG. 1 is a schematic diagram of a computer system incorporating a power measurement scheme in accordance with an embodiment of the invention.

A server management network AP1 includes many servers, including a server 11 and other servers 13, as shown in FIG. 1. Server 11 includes an AC plug 15, an RF choke 17, a bulk AC/DC power supply 19, processors 21, memory 23, input/output devices 25, and fans 27. RF choke 17 includes a pair of inductors 31 and 33 and a magnetic core 35.

In accordance with an embodiment of the invention, server 11 further includes an AC power sensor system 40 including a sensor 41, a filter and analog-to-digital converter circuit 43, and a logic block 45. AC power sensor 41 includes an additional inductor coupled to magnetic core 35. Sensor 41 detects the AC power through choke 17.

The output of sensor 41 is a stepped-down analog voltage waveform. This waveform is rectified, filtered, and digitized by circuit 43. The digital output of circuit 43 is scaled and formatted by logic block 45 to put it in a form usable by server management subsystem 47.

Server management subsystem 47 controls processors 21, memory 23, input/output devices 25, and fans 27. In addition, it can interrogate these device types to determine their performance levels. In particular, subsystem 47 uses the performance and power measurement data to set a tradeoff between performance and power for each of these device types, and thus the amount of power they respectively draw from power supply 19. Programmable local policies 49 of server management subsystem 47 govern how such tradeoffs are determined.

For example, server management subsystem 47 can monitor processor utilization, i.e., the percentage of processing capacity used by a workload over time. If utilization is lower than needed to handle intermittent peaks, then performance can be scaled back by lowering a processor clock rate or inactivating some processors, cores, or processor functionality. Likewise, the power consumed by memory modules can be used by lowering clock rates or inactivating some modules. On the other hand, even if utilization is low, high performance can be maintained if power consumption is well within budgeted limits.

Server management subsystem 47 communicates via server management network AP1 with respective server management subsystems 51 of other servers 13. Each server management subsystem 51 manages the respective server 13 with local management policies. One of the server management subsystems can serve as a global manager, e.g., so that a power budget for network AP1 can be distributed among servers 11 and 13 according to global policies 53.

Servers and other computers almost always incorporate switching power supplies, which inherently generate RF noise that could leak into the AC mains and interfere with the operation of other RF devices. Due to worldwide EMI requirements, all AC bulk power supplies incorporate a common-mode choke to block RF noise along the AC power path. Externally generated noise can be filtered out before AC power reaches the power supply, while switching noise generated by switching power supplies is prevented from escaping into the AC mains supply.

The common-mode choke is a substantial component of a computer, as it is normally rated to handle the maximum required AC current that the incorporating computer might demand. Such a choke can include a pair of inductive loops, e.g., in a bifilar configuration, wound around a former, e.g., a magnetic core. The choke of the present invention inductively couples an additional inductive loop to the main inductive loops. Power drawn through the main loops induces a small current proportional to the current, and thus power, flowing through the choke.

Switching power supply 19 employs a high-voltage isolated flyback topology. As a result, the switching currents across the current sense loop 35 are minimal. This allows the loop to accurately measure AC power. The currents generated in the sense loop are quite small so the loops can be quite small (relative to the main choke inductors). Since the sense loop is small, there is negligible amount of magnetic flux in the choke lost through the sense loop so that negligible power is lost or wasted.

The sense signal output by sense loop 37 is filtered and converted to digital data by ADC 43. Logic block 45 calculates and logs the actual AC power. This logged power-versus-time data is then made available to server management subsystem 47, which then can act locally to reduce power drawn or coordinate with other servers 13 via the server management network AP1 to achieve group-wide server budgets. As described above, the invention provides an accurate and ultra-low cost power measurement technique using magnetic current sensing by a modified common-mode choke.

Figure 2:
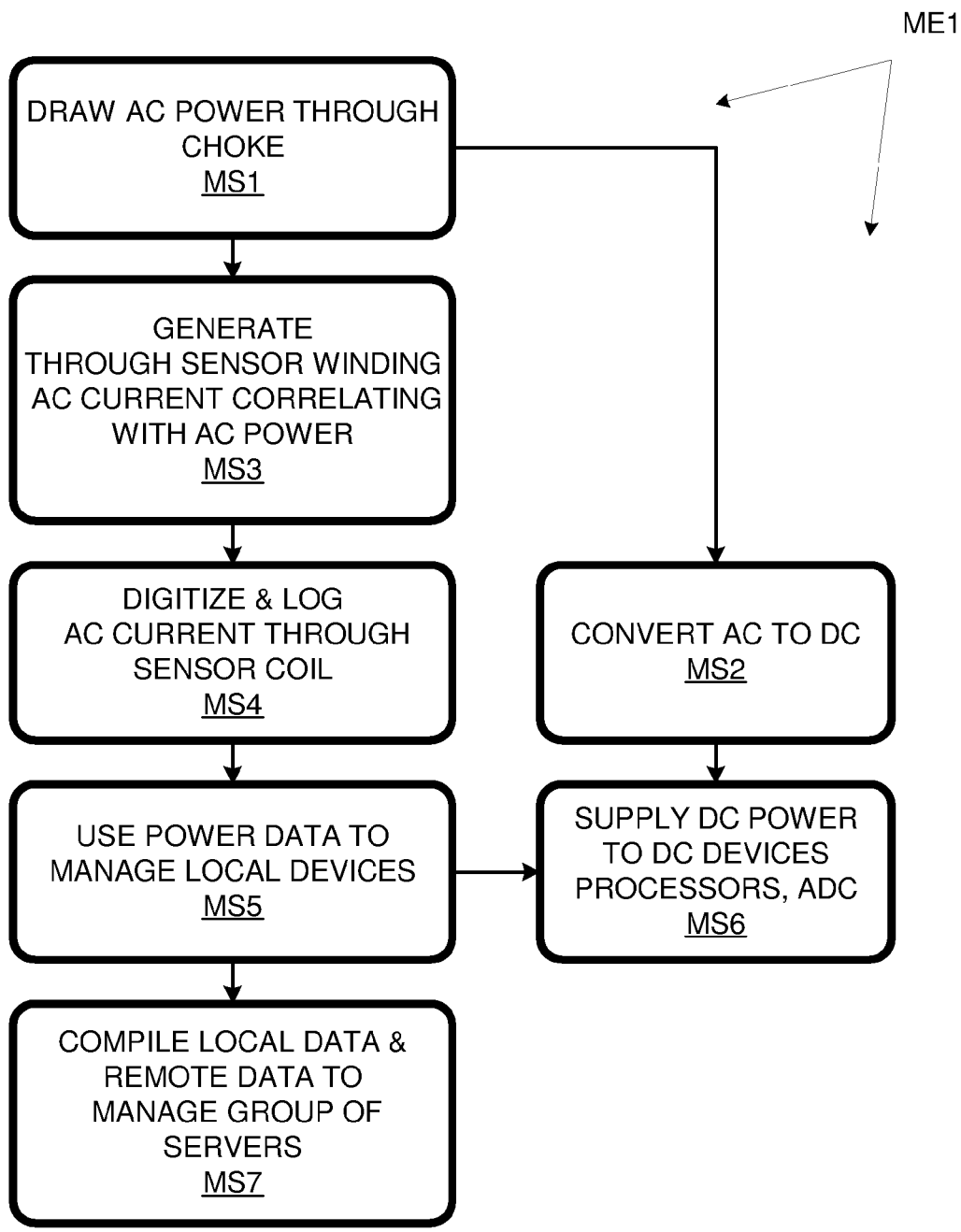
FIG. 2 is a flow chart of a method in accordance with an embodiment of the invention.

The invention provides for a method ME1, flow charted in FIG. 2. At method segment MS1, AC power is drawn through AC plug 15 and choke 17. This power is supplied to power supply 19, which converts the AC power to DC power at method segment MS2. The AC power through choke 17 generates a current through sense loop 37 proportional to the AC power at method segment MS3. This current is converted to digital data at method segment MS4.

The power generated at method segment MS2 is used to power devices including processors, memory, communications devices, ADC 43, and logic 45. At method segment MS5, the power data is used to control the power consumed by some of these devices. At method segment MS6, the data is exported and compiled with data from other servers to provide for group-wide power budgeting.

The power data can be used to control the power consumed by server 11. The major power consuming subsystems in a server are its processors, memories, communications devices, fans, and hard drives. The power to the processors can be reduced by 1) commanding the processor to throttle its core frequency, 2) commanding the processor to shut down one or more of its cores, 3) commanding a main frequency synthesizer to reduce a Front Side Bus (FSB) frequency. The last method also serves to reduce the power drawn by memory.

Another memory power reducing method is to command processors with integrated memory controllers to shutdown one or more memory controllers to reduce parallelism, e.g., instead of running an entire 256-bit wide memory bus, run the bus at 64-bit wide. This allows several memory banks to be idled. A negative performance impact will be expected but this can be offset by active group power management. The fans in a server can be selectively reduced in speed or shutdown while monitoring temperature to reduce power. Communications devices can be idled by software command or an actual slot power down.

The power consumption data from server 11 can be compiled along with similar data from other servers 13 to provide for network-wide power budgeting. Each server 13 can have its own server management subsystem 51. Each server management subsystem 51 can respond to local policies 53, e.g., to control power consumption by incorporated devices such as processors 55.

A separate console can allow an administrator to set power policies for servers 11 and 13. Alternatively or in addition, one of the server management subsystems can serve as a global or group management system, collecting power data from all servers and allocating power budget to individual servers in accordance with global policies.

Typically, multiple servers are co-located in the same room. This can be expanded across rooms and even across buildings (e.g., in the case of a server farm). Co-located servers are typically managed via their server management network. The administrator then manages the servers via a single computer tied to the server management network. Since the server management network presents a means for the administrator to know and control the power consumed by each server, active power management can be as simple as assigning each server a priority number.

The administrator can then command servers with the highest priority to continue running at maximum performance while the servers at a lower priority run at reduced performance for power savings. The power saved is then calculated by the server management software, and thus allows the administrator to "dial" in a required amount of power savings. This concept can be extended by grouping servers. Through the server management function, they can then coordinate their power reduction.

In an alternative embodiment, the server management function also controls room cooling. A target maximum electricity operating cost can be set (that translates into a maximum total power limit for the whole room). The server management software will then actively control room temperature and power drawn by each server as to stay within the limit. This concept can be expanded into buildings and entire server farms. To maintain performance, the server management software can alert the administrator if the computational load on a group of servers causes a power increase that approaches the preset limit. The administrator can then choose to increase the power limit or simply bill the customer for the excess indicated by the power consumption data.

The invention provides a choke modified to provide for power measurements. The invention also provides a power supply and a computer system incorporating such a choke. The invention also provides a method for measuring and controlling AC power consumption, e.g., using the choke. These and other variations upon and modifications to the described embodiments are provided for by the present invention, the scope of which is defined by the following claims.

What is claimed is:

1. An electrical device comprising a common-mode choke having relatively high-inductance windings inductively coupled to each other to filter relatively high-frequency waveforms, said choke including a relatively low-inductance winding inductively coupled to said relatively high-inductance windings so that, when relatively low-frequency AC power is drawn through said relatively high-inductance windings by a power supply, an AC waveform is generated in said relatively low-inductance winding, said AC waveform having a sense AC voltage that correlates with the AC power drawn by said power supply.

2. An electrical device as recited in claim 1 further comprising a switching power supply for converting said relatively low-frequency AC power to DC power.

3. An electrical device as recited in claim 2 wherein said power supply has an isolated flyback topology.

4. An electrical device as recited in claim 2 further comprising an analog-to-digital converter for converting said AC waveform to digital data indicating the amount of power drawn by said power supply.

5. An electrical device as recited in claim 4 wherein said converter is coupled to said power supply for receiving DC power therefrom.

6. An electrical device as recited in claim 1 further comprising an analog-to-digital converter for converting said AC waveform to digital data indicating the amount of power drawn through said relatively high-inductance windings.

7. An electrical device as recited in claim 1 wherein said relatively high-inductance windings are arranged in a bifilar structure not including said relatively low-inductance winding.

8. A method comprising:
a power supply drawing AC power through inductors of a choke;
generating an AC waveform in an inductor of said choke through which said AC power is not drawn; and
measuring a magnitude associated with said AC waveform.

9. A method as recited in claim 8 wherein said measuring involves converting said AC waveform to digital data.

10. A method as recited in claim 9 further comprising converting said AC power to DC power.

11. A method as recited in claim 10 wherein said converting consumes some of said DC power.

12. A method as recited in claim 11 further comprising powering a digital data device selected from a set consisting of data processors, digital data memory devices, and digital data communications devices using said DC power, said digital data device providing for selecting among plural tradeoffs between power and performance.

13. A method as recited in claim 12 further comprising controlling said tradeoffs at least in part as a function of said magnitude.

14. A method as recited in claim 11 further comprising controlling the power consumed by a device that does not receive DC power from said power supply.

15. A computer system comprising:

a data processor;

a power supply for converting AC power to DC power, said power supply being electrically coupled to said data processor for providing DC power thereto;

a choke through which said AC power is supplied to said power supply, said choke having an inductor through which said AC power is not supplied to said power supply, said inductor generating an AC waveform therethrough having a magnitude correlating with an amount of AC power being supplied to said power supply.

16. A computer system as recited in claim 15 wherein said power supply is a switching power supply.

17. A computer system as recited in claim 16 wherein said power supply has an isolated flyback topology.

18. A computer system as recited in claim 15 wherein said choke is a common-mode choke.

19. A computer system as recited in claim 15 further comprising means for controlling DC power consumed by said data processor at least in a part as a function of said magnitude.

20. A computer system as recited in claim 19 wherein said means for controlling DC power consumed by said data processor also provides for controlling the power consumed by a remote data processor not coupled to said power supply and receiving DC power from a remote power supply.

21. A computer system as recited in claim 15 further comprising an analog-to-digital converter for converting said AC waveform to digital data indicating said amount of power.

22. A computer system as recited in claim 21 wherein said analog-to-digital converter is coupled to said power supply for receiving DC power therefrom.

\* \* \* \* \*